United States Patent [19]
Poerio et al.

[11] Patent Number: 5,784,884
[45] Date of Patent: Jul. 28, 1998

[54] FAIL-SAFE TRANSFER VALVE

[75] Inventors: Wayne M. Poerio, Juno Beach; Matthias Eder, Stuart, both of Fla.

[73] Assignee: United Technologies Corporation, Hartford, Conn.

[21] Appl. No.: 575,567

[22] Filed: Dec. 20, 1995

[51] Int. Cl.$^6$ .................. F16D 31/02; F15B 11/00
[52] U.S. Cl. .................. 60/403; 91/509; 91/459
[58] Field of Search .................. 60/403; 91/509, 91/519, 435, 458, 459

[56] References Cited

U.S. PATENT DOCUMENTS

| | | | |
|---|---|---|---|
| 3,295,420 | 1/1967 | Gleason | 91/509 X |
| 4,143,583 | 3/1979 | Bauer et al. | 91/509 X |
| 4,567,813 | 2/1986 | Garnjost | 91/509 X |
| 4,601,169 | 7/1986 | Hesse et al. | 91/509 X |
| 5,343,703 | 9/1994 | Kamimura | 60/403 |

*Primary Examiner*—Hoang Nguyen
*Attorney, Agent, or Firm*—Norman Friedland

[57] ABSTRACT

The main control servo valve responsive to electrical input signals modulates a power piston to position a throttle valve that varies the flow of fluid during normal operation. A transfer servo valve responsive to the pressure in the servo system moves hard over upon sensing a low pressure signal that is normally lower than the system's pressure to cause the power piston to position the throttle valve closed. In the preferred embodiment the system throttles compressor air of a gas turbine engine to provide an anti-icing function and activates the transfer servo valve upon a hard over malfunction.

5 Claims, 2 Drawing Sheets

FAIL-SAFE TRANSFER VALVE

This invention was made under a United States Government contract and the Government has in interest herein.

TECHNICAL FIELD

This invention relates to a fail-safe valve and particularly to a servo system for shutting off the flow in a fluid conducting conduit whenever a failure in the hard over position in the control system occurs.

BACKGROUND ART

As is well known in aircraft/engine technology it is abundantly important to assure that certain systems in the engine or aircraft are shut down in the event that a failure in the hard over position is evidenced. Typically such systems through an electrical or electronic feedback or electrical or electronic sensing system monitor the system and relay an electrical signal to an electrical solenoid to effectuate a shut off function upon detection of a failure in the hard over position.

There are a sundry prior art patents that teach the use of solenoid valves for shutting down a system for one reason or another. For example, U.S. Pat. No. 2,938,537 granted to Jensen et al on May 31, 1960 discloses a simplified solenoid valve that serves to shut down the system by a manual input to the system. A somewhat more complex system using a solenoid operated valve is disclosed in U.S. Pat. No. 3,669,559 granted to Teetsuzo Sakamoto et al on Jun. 13, 1972. Fail-fixed types of solenoid operated systems are disclosed in U.S. Pat. No. 4,276,809 granted to Kast on Jul. 7, 1981 and U.S. Pat. No. 4,375,780 granted to Davis on Mar. 8, 1983. In all of these systems, a solenoid valve is utilized for performing the fail-safe or fail-fixed function.

We have found that we can obviate the problems and disadvantages associated with the solenoid operated valve by completely eliminating the solenoid, yet performing the same function hydro-mechanically. To this end the present invention eliminates the electrical aspects of the solenoid valve and hence, eliminating the necessity of an electrical interface, and, in addition reduces costs and weight.

SUMMARY OF THE INVENTION

An object of this invention is to provide an hydromechanical fail-safe system.

A further object of this invention is to provide an improved hydromechanical fail-safe system with an equal-area servo piston that is activated upon receiving a low pressure signal that is characterized as being less expensive, lighter and avoids any electrical interface.

A further object of this invention is to provide an improved fail-closed hydromechanical system for an anti-icing system for aircraft powered by a turbine type of power plant.

The foregoing and other features of the present invention will become more apparent from the following description and accompanying drawings.

DETAILED DESCRIPTION OF THE PREFERRED EMBODIMENT

While this invention is being disclosed in its preferred embodiment as a fail-closed hydromechanical servo mechanism for an anti-icing system for a gas turbine engine powering aircraft, as one skilled in this art will appreciate the system described herein could be utilized in any other hydromechanical or electromechanical system where it is desirable to have a fail-safe feature. Obviously, the failure in the hard over position could manifest an opened position as well as a closed position.

Figure 1:
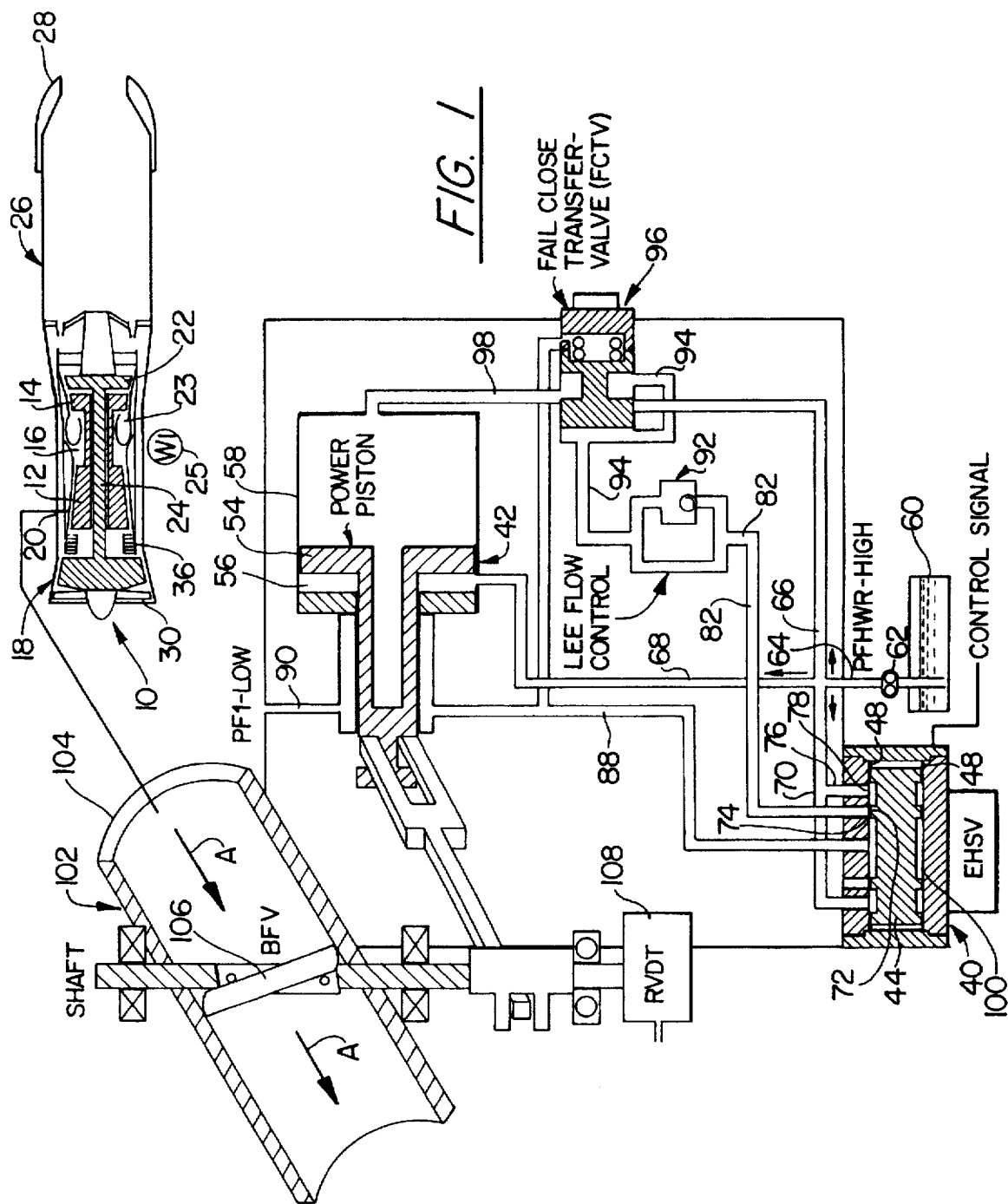
FIG. 1 is a schematic illustration of the invention during normal anti-icing operation.

Referring to the schematic in FIG. 1, there is schematically shown a gas turbine engine generally indicated by reference numeral 10 of the type that includes twin spools. The high pressure spool or gas generator includes the high pressure compressor 12 driven by the high pressure turbine 14 interconnected by shaft 24 mounted about the axis of the engine for rotational movement. The low pressure spool consists of the low pressure compressor which may also include a fan and the low pressure turbine 22 interconnected by the shaft 16 that is coaxially mounted relative to shaft 16. Air admitted through the inlet passing through vanes 30 is admitted to the fan/compressor 18 where a portion is fed to the gas generator and a portion of air bypasses the main engine through the bypass duct 20. The air fed to the gas generator is compressed by the low pressure compressor 18 and further compressed by the high pressure compressor 12 after being regulated by the vanes 36 for maximizing the angle of attack. Fuel is fed to the annular burner 23 which is controlled via the fuel control 25 where it burns to generate and accelerate the already heated air for powering the turbines and providing thrust. The engine may include an augmentor 26 for enhancing the thrust during certain engine operations and an exhaust nozzle 28 to change the exhaust discharge area to accommodate augmenting operation and non-augmenting operations.

Figure 2:
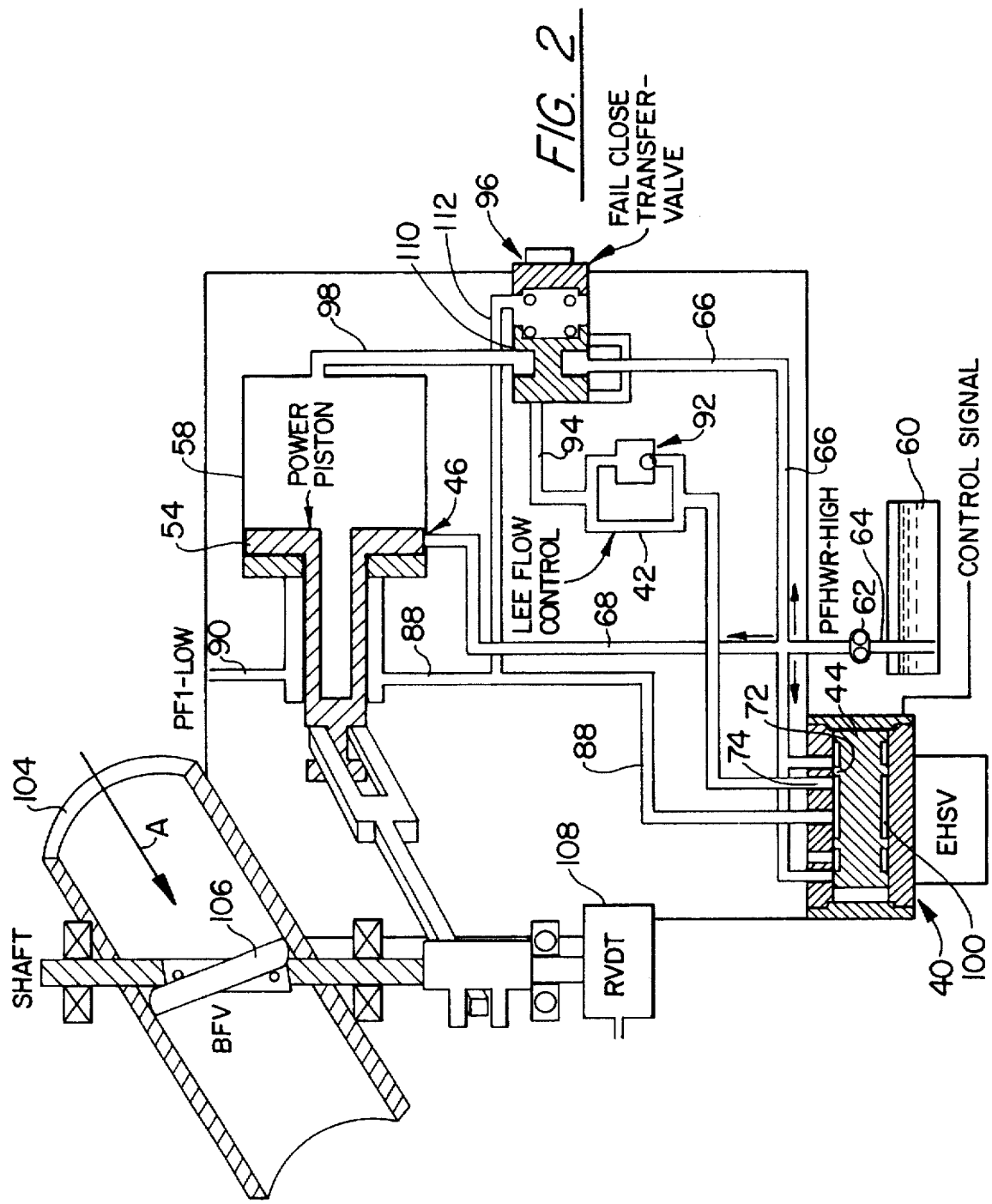
FIG. 2 is a schematic illustration substantially identical to FIG. 1 when the fail-closed system is activated.

The electromechanical servo system depicted in FIGS. 1 and 2 includes an electrohydraulic servo valve (EHSV) generally indicated by reference numeral 40 that serves to control the flow and pressure of the servo fluid for the power piston generally indicated by reference numeral 42. The EHSV 40 is controlled by an electronic control (not shown) that could be a suitable commercially available digital control such as the FADEC manufactured by Hamilton Standard Division of United Technologies Corporation, the assignee common to this patent application. The input signal through the lead wires positions the spool 44 mounted in the cylindrical bore 46 of the closed end housing 48. Spool 44 translates rectilinearly between end caps 50 and 52 for communicating high and low pressure servo fluid as shown. The EHSV 40 modulates the piston 54 of the power piston 42 which is a half area piston with high pressure normally admitted to the working faces 56 and 58 thereof. The position sought by piston 54 will be dictated by the flow into the chambers on either side of the piston 54. In the normal operating position as shown in FIG. 1 the high pressure fluid which taken from the reservoir 60 is pressurized by suitable pumps 62 which is fed into the servo system via line 64. This high pressure fluid is split in three branches 66, 68 and 70. High pressure fluid is normally fed to the back side of piston 54 to act on face 58 via the lines 66, the fail close transfer valve 80 (FCTV) and lines 94 and 98. The pressure acting on piston 54 can be modulated by translating spool 44 toward the right or left hand end. Branch lines 66 and 68 direct high pressure fluid to the EHSV 40 and lines 88 and 90 connect the EHSV 40 to low pressure fluid, which may be at sump pressure. To communicate high pressure servo fluid to the opposite faces 56 and 58 of the piston 54 spool 44 is translated to the left. This causes land 72 of spool 44 to uncover port 74 to communicate high pressure servo fluid to the back side of piston 54 to act on face 58 via the branch line 76 annulus 78, line 82 through the Lee Flow Control 92, line 94, the Fail Close Transfer Valve 80 and line 98. To translate the power piston 54 to the opposite direction the piston 54 is connected to the low pressure by connecting port 72 to the annular passage 100 formed in spool 44. Leading high pressure to piston 54 and connecting it to sump pressure causes piston to translate rectilinearly and hence control the position of the throttle valve generally indicated by reference numeral 102. The butterfly 104 valve rotatably supported in conduit 106 serves to throttle high temperature air bled from the compressor of the engine as shown by arrows A. The RVDT 108 is an electronic transducer that converts the rotational movement of the butterfly valve 104 and relays a proportionate signal back to the engine control FADEC (not shown) to reposition the throttle, if necessary to assure that only sufficient compressor air is bled from the engine that will serve the anti-icing function.

In accordance with this invention the FCTV is disposed between the EHSV 40 and the power piston 54 to assure that the throttle valve is moved to the closed position whenever the EHSV 40 fails or malfunctions in the hard over position. FIG. 2 illustrates the fail-closed mode. An EHSV malfunction in the hard over position will cause the spool 44 to move hard over toward the right hand side as shown in the drawing. The same sequence of events will occur should the hard over position be on the left had side. Only one scenario will be described hereinbelow for the sake of convenience and simplicity. This interconnects the FCTV with low pressure and the spring 106 acting on the equal area spool valve 110 causes the spool 110 to move hard over to the left hand side which interconnects lines 66 and lines 98 for porting high pressure on the back face of piston. This closes the butterfly valve 106 to prevent the flow of compressor bleed to flow downstream in conduit 104. The Lee Flow Control utilizes the flow restrictor 112 which serves to control the slew rate of the FCTV and hence the power piston 54 and ultimately the rate of change of butterfly valve 106. The Lee Flow control will back pressure the FCTV and also aid in preventing pressure perturbations.

An advantage of the invention is that the FCTV can be evaluated and tested by an engine digital system analyzer without having to operate the anti-icing system. By actuating the FADEC to request a closure of the throttle valve the position of the LVDT feedback can be visually observed to evaluate the response.

As mentioned earlier the FCTV is a hydromechanical device that functions to close the throttle valve upon detecting a low pressure response in the system that is axiomatic when the EHSV malfunctions in the hard over position. This hydromechanical approach avoids the necessity of utilizing the solenoid valve and hence eliminates the electrical interface that would accompany the solenoid valve. Inherently the hydromechanical fail-closed system weighs less than the solenoid and is less expensive.

Although this invention has been shown and described with respect to detailed embodiments thereof, it will be appreciated and understood by those skilled in the art that various changes in form and detail thereof may be made without departing from the spirit and scope of the claimed invention.

We claim:

1. A fail-safe hydromechanical apparatus for a servo system including servo fluid being at a high and low servo pressure, a power piston for providing an output signal, control means for generating an electronic signal, a hydraulic servo valve responsive to said actuation of control means for controlling said power piston, said fail-safe hydromechanical apparatus comprising an equal area shuttle valve, said shuttle valve being responsive to high and low servo pressure, fluid connecting means interconnecting high pressure, said power piston and said equal area shuttle valve, resilient means abutting said shuttle valve, said shuttle valve having a working face subjected to high and low servo pressure, means for connecting said working face with low pressure when said hydraulic servo valve malfunctions in the hard over position, said resilient means being sized to position said shuttle valve to connect said high pressure servo fluid to said power piston to position said power piston in the fail-safe position.

2. A fail-safe hydromechanical apparatus for a servo system as claimed in claim 1 wherein said resilient means is a coil spring.

3. A fail-safe hydromechanical apparatus for a servo system as claimed in claim 2 including means for controlling the slew rate of said shuttle valve.

4. A fail-safe hydromechanical apparatus for a servo system as claimed in claim 3 including a conduit for conducting fluid, a throttle valve responsive to said output rotatably mounted in said conduit for open and closed positions, wherein said throttle valve is positioned to one of said positions when said power piston is positioned to said fail-safe position.

5. A fail-safe hydromechanical apparatus for a servo system as claimed in claim 4 wherein said fail-safe hydromechanical apparatus is fail-closed, said throttle valve being positioned to said closed position whereby fluid in said conduit ceases to flow.

* * * * *